Oct. 17, 1933.   L. J. JOHNSON   1,931,075
PROPELLER DRIVE FOR OUTBOARD MOTORS
Filed April 4, 1928
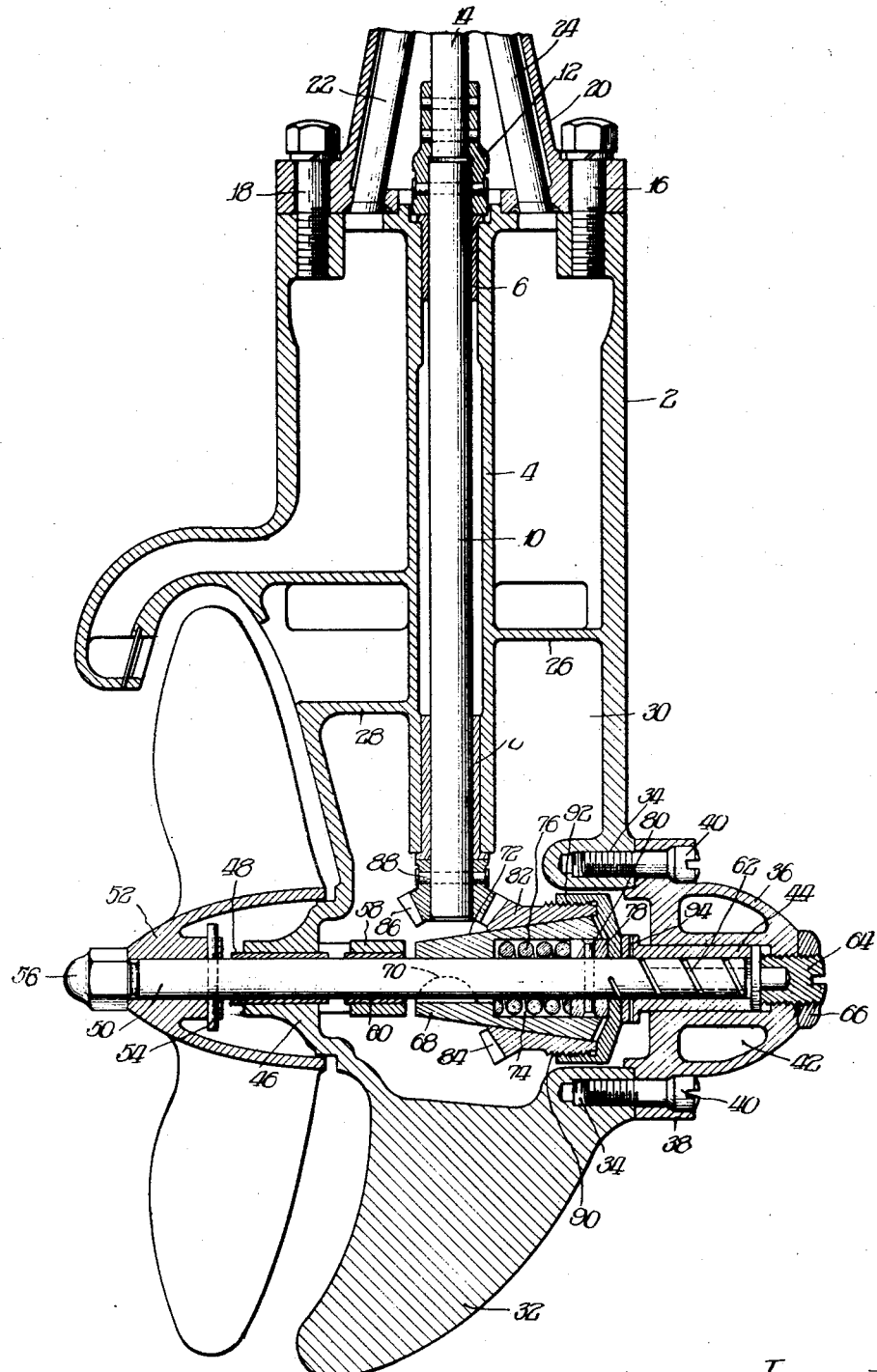
Inventor:
Louis J. Johnson,
By Cheever & Cox
Attys.

Patented Oct. 17, 1933

1,931,075

UNITED STATES PATENT OFFICE 1,931,075

PROPELLER DRIVE FOR OUTBOARD MOTORS

Louis James Johnson, Waukegan, Ill., assignor to Johnson Brothers Engineering Corporation, South Bend, Ind., a corporation of Indiana Application April 4, 1928. Serial No. 267,468

5 Claims. (Cl. 115—17)

My invention relates to driving devices for the propeller of an outboard motor and more particularly to a shock absorbing means arranged in the driving connection between the motor and the propeller and in particular, located in the submerged gear housing and constructed and arranged so that when the propeller strikes solid objects such as rocks, logs, snags, and the like, the shock absorbing mechanism will yield so as to prevent injury to the propeller.

Another object of my invention resides in the construction and arrangement of the shock absorbing mechanism in the form of a slip clutch located on the propeller shaft within the gear housing which location provides a convenient and compact arrangement not only for assembly but for constructional and repair purposes and for facility in function and operation.

Another object of my invention resides in the arrangement of this slip clutch in combination with the shear pin connecting the propeller rigidly to the propeller drive shaft and wherein the slip clutch is arranged to yield at a point of pressure at which the shear pin will not break whereby the shear pin itself is protected and which shear pin in turn will break in case the slip clutch fails to function.

Yet another object of my invention resides in the particular details of construction of the slip clutch itself and the manner in which the spring portion thereof is housed within the portions of the clutch and about the propeller drive shaft whereby a most compact arrangement is provided.

Still another object of my invention resides in the details of construction of this slip clutch and the bearings for the propeller drive shaft and particularly the manner in which lubricant within the gear housing may be fed to one end of the propeller drive shaft.

These and other objects of my invention will be apparent from a perusal of the following specification when taken in connection with the accompanying drawing wherein:

The single figure is a side sectional view of the preferred construction of my present invention.

Referring now to the drawing in detail, in the form shown, a gear case 2 is shown as comprising a hollow casting preferably of light metal such as aluminum or aluminum alloy. It is provided in a vertical direction with a substantially central tubular bearing 4 in which fit upper and lower bearings 6 and 8 respectively in which the substantially vertical drive shaft 10 is mounted. This shaft is provided with a coupling 12 which connects with shaft 14 driven from the gas engine forming the prime mover of the outboard motor as is well known in the art. The upper portion of the housing 12 is provided with bolt holes to receive the fastening bolts 16 and 18 adapted to connect an upper hollow casing 20 with the gear casing 2 in the manner shown in my application filed jointly with Harry L. Johnson, January 16, 1928, Serial No. 247,004. This upper section 20 is preferably provided with water conduits such as pipes 22 and 24 connecting with the water cooling system of the engine jacket. In the preferred form of my invention this upper section 20 and the lower housing 2 are adapted to be turned for steering or may be turned 180 degrees for reversely driving the boat. If desired, the housing 2 may be stationary as in some types of outboard motors.

The housing 2 is provided with partitions 26 and 28 which form a lower chamber 30 adapted to contain lubricant. In addition, the lower portion of the housing 2 is provided with a depending projection or skeg 32. The front part of the housing is preferably provided with an opening, the edge walls of which are formed with threaded bolt holes 34 for receiving a gear case head 36. This gear case head is in turn provided with a peripheral flange 38 formed with holes and sockets through which bolts 40 pass so as to attach the head to the housing. This head is preferably formed with hollow portions 42 for lightness and is formed centrally with a seat for a tubular bearing 44 in which one end of the propeller shaft is mounted as hereinafter described. The front wall of the gear case head forms a substantially blunt nose in conformation with the usual blunt nose of a streamline formation. The rear of the lower portion of the housing 2 is provided with rearwardly projecting walls 46 and an opening for a bearing 48 in line with the bearing 44. This bearing 48 receives the opposite end of the propeller shaft 50. The propeller 52 is mounted directly upon the shaft 50 and is rigidly held thereon by means of the shear pin 54. The outer end of the shaft is provided with a nut 56 which closes the open end of the propeller 52 about the shaft 50. In addition, the lower portion of the housing 2 is provided with a hollow sleeve 58 carrying a bearing 60 for the intermediate portion of the propeller shaft 50. The front portion of the propeller shaft 50 is provided with a spirally arranged oil groove 62 and this portion of the shaft is adapted to revolve in the bearing sleeve 44. A threaded plug 64 closes the front end of the gear case head and is in line directly with the front end of the propeller drive shaft 50. A lock nut 66 threads onto the plug 64.

The shock absorbing device, forming one of the important features in my present invention, is mounted directly within the lower portion of the propeller carrying housing 2 and concentrically about the propeller shaft 50 so that it is wholly enclosed in oil and may be removed from the housing 2 by removing the gear case head 36. The shock absorbing device comprises a slip clutch formed of an inner clutch member 68 slidably keyed by means of a key 70 on shaft 50, sliding in a groove formed in the bore of the member 68. This inner clutch member has an outer conical face 72 and is provided with a hollow recess 74 for housing a coil spring 76. The enlarged end of the inner member of the slip clutch is open so as to permit the insertion of the spring into its recess and this opening is closed by a plug or collar 78 which may be secured directly to the drive shaft 50 by means of diametrically disposed pins 80. The outer member of the slip clutch 82 likewise has a conical bore face adapted to contact with the face 72 of the inner clutch member. In addition, this outer member 82 is provided with bevel gear teeth 84 adapted to mesh with bevel gear teeth 86 on the lower end of the bevel gear pinned as at 88 to the vertical motor driven shaft 10 and the forward end of the outer member 82 of the slip clutch is provided with threads 90 upon which screws a collar or cap 92 having an inwardly extending flange engaging over the front face of plug 78 and fitting somewhat closely about the drive shaft of the propeller shaft 50 so as to form a complete housing for the inner member 72 of the slip clutch. The rear face of the bearing 44 is provided with an oil duct 94 whereby oil may be fed to the spiral duct 62.

If the propeller should strike a snag or solid object, the slip clutch is permitted to give so that the engine may continue to rotate shaft 10 and bevel gear 86 and gear 82 without driving the shaft 50. In case the clutch faces stick, if the propeller should strike a snag or solid object, then the shear pin 54 will break so that the propeller is not injured.

It will be noticed that the parts of the clutch are practically enclosed in a housing formed by the outer clutch member 82 and the threaded collar 92 and that the plug 78 serves wholly to enclose the spring 76 within the housing formed by the inner clutch member and concentrically about the drive shaft 50. It will also be appreciated that the rear end of the bearing sleeve 44 likewise forms a substantially sealed joint about the open end of the collar 92 and that this same bearing is provided with an oil channel 94 which may feed lubricant contained within the chamber 30 to the spiral lubricant feed 62 on the front end of the shaft.

It will be further appreciated that by reason of the construction of the gear case head 36 and the manner in which it provides a bearing for the sleeve 44 at the front end of the shaft, a very convenient and practical mounting of the propeller shaft 50 is provided while at the same time by mounting this head 36 in the removable manner as indicated, provision is given for the assembly and removal of the slip clutch and its shaft directly from the housing 2.

Those features of the housing 2 concerned with the formation of the water circulating passages and particularly with reference to their location in respect to the blades of the propeller are not herein described since they form the subject matter of other patents and applications filed by me and by Harry L. Johnson and me jointly.

Having thus described my invention, what I claim as new and desire to secure by Letters Patent is:

1. The combination with the submersible housing of an outboard motor and a propeller drive therefor, including a substantially vertically disposed power shaft and a propeller shaft angularly disposed therewith, a bevel gear on said substantially vertically disposed shaft, a first clutch member on said propeller carrying shaft and a second clutch member cooperating with said first clutch member and provided with bevel gear teeth and meshing with the teeth of the first mentioned gear and a spring urging said clutch members normally into clutching engagement, said spring encircling the propeller drive shaft and being housed within the first clutch member.

2. In a device of the class described, the combination with a submersible housing having a frontal opening, a gear case head detachably closing said opening and having a bore, a tubular bearing in said bore, a propeller drive shaft carried by said bearing, a registering bearing carried by the rear end of said housing and in which said propeller drive shaft is mounted, a frustro-conical clutch member slidably supplied on said propeller carrying shaft and provided with a recessed portion about said shaft, a spring coiled about said shaft and seated in said recessed portion, a collar pinned to said shaft enclosing said recessed portion, a second frustro-conical clutch member concentrically surrounding said first clutch member and provided with an exterior thread, a collar threaded upon the thread of said outer clutch member and having a flange encircling the propeller carrying drive shaft, a bevel gear on said outer clutch member and meshing with a second bevel gear and a substantially vertical drive shaft rigidly carrying said second bevel gear and a propeller on the rear end of said propeller carrying shaft.

3. In a device of the class described, the combination with a housing having a substantially vertically extending motor driven shaft provided with a bevel gear on its lower end, the lower portion of said housing having transversely disposed bores at its front and rear end, a gear case head detachably mounted on said housing so as to close said front opening, a tubular bearing in said gear case head, a screw plug closing the front of said gear case head, a propeller carrying drive shaft mounted in the bearings of said gear case head and said housing, a slip clutch having a part slidable with respect to said shaft and a part having a gear connection with the bevel gear on said motor driven shaft and a spring for normally keeping said parts in clutched connection, a propeller on the rear end of said propeller carrying shaft, a spirally arranged lubricant groove on the forward end of said shaft and an oil feed channel at the rear end of said bearing carried by the gear case head adapted to feed oil to said spiral groove.

4. A shock absorbing device for the propeller drive of an outboard motor comprising in combination a submersible housing, a motor driven shaft mounted therein, a propeller carrying shaft mounted therein, a propeller on said shaft, a shear pin rigidly connecting said propeller to said shaft and a slip clutch forming a part of a driving train between said propeller carrying shaft and the motor driven shaft, said slip clutch being constructed and arranged to release prior to the breakage of the shear pin.

5. An outboard motor construction comprising in combination with the submersible gear housing thereof, a motor driven shaft carried thereby provided with a bevel gear on its lower end, said submersible housing having a relatively large opening in its front end and a gear case head having means for detachably connecting the same to said housing, said gear case head carrying a shaft bearing, a propeller carrying shaft mounted in said bearing and a slip clutch mounted on said shaft and having a driving connection with the bevel gear on said motor driven shaft, said slip clutch being arranged in line with the opening formed by said gear case head and made smaller than said gear case head whereby to be removable through said opening when said gear case head is removed, and a propeller carried on the rear end of said propeller carrying shaft.

LOUIS JAMES JOHNSON.